United States Patent [19]

Vanderbilt et al.

[11] Patent Number: 4,804,547

[45] Date of Patent: Feb. 14, 1989

[54] ANIMAL FEED SUPPLEMENT FORMULATION

[75] Inventors: Jeffrey J. Vanderbilt; Garrett C. Luce; Albert C. Ruggles, all of Longview, Tex.

[73] Assignee: Eastman Kodak Company, Rochester, N.Y.

[21] Appl. No.: 136,304

[22] Filed: Dec. 22, 1987

Related U.S. Application Data

[63] Continuation of Ser. No. 830,791, Feb. 19, 1986, abandoned.

[51] Int. Cl.$^4$ .............................................. A23K 1/175
[52] U.S. Cl. ...................................... 426/74; 426/454; 426/601; 426/648; 426/807
[58] Field of Search ...................... 426/2, 74, 454, 623, 426/630, 648, 807, 607

[56] References Cited

U.S. PATENT DOCUMENTS

| | | | |
|---|---|---|---|
| 3,014,800 | 12/1961 | Guidarelli | 426/454 |
| 3,051,571 | 8/1962 | Percament | 426/454 |
| 3,464,828 | 9/1969 | Cummisford | 426/454 |
| 3,468,667 | 9/1969 | Chandler et al. | 426/807 X |
| 3,993,796 | 11/1976 | Steinke | 426/454 |
| 4,376,790 | 3/1983 | Ames | 426/648 X |

OTHER PUBLICATIONS

Kirk-Othmer, "Encyclopedia of Chemical Technology" Third Edition (1982) vol. 17, pp. 92-96.

*Primary Examiner*—R. B. Penland
*Attorney, Agent, or Firm*—S. E. Reiter; John F. Stevens; William P. Heath, Jr.

[57] ABSTRACT

Disclosed are animal feed supplement formulations comprising (a) mixtures of calcium salts of certain volatile fatty acids and (b) coconut oil or mixtures of coconut oil with tallow. Such formulations are easily pelletizable and resistant to caking and dusting.

12 Claims, No Drawings

ANIMAL FEED SUPPLEMENT FORMULATION

This is a continuation of application Ser. No. 830,791 filed on Feb. 19, 1986 now abandoned.

DESCRIPTION

1. Technical Field

This invention relates to novel animal feed supplement formulations and, more particularly, to novel, non-dusting, pelletizable animal feed supplement formulations comprising mixtures of calcium salts of certain volatile fatty acids and coconut oil, or coconut oil and tallow.

2. Background of the Invention

U.S. Pat. No. 4,376,790 and the literature references cited therein disclose that supplementing the diet of dairy cattle with certain volatile fatty acids, including ammonium salts of isobutyric acid, 2-methylbutyric acid, valeric acid, isovaleric acid and mixtures thereof results in improved milk production. To minimize objectionable odors of these acids while improving handling characteristics, they may be converted to their calcium salts, for example, by reacting the liquid acids with lime. A mixture of the calcium salts of isobutyric, 2-methylbutyric, valeric and isovaleric acids is presently being supplied to the dairy industry by Eastman Chemical Products, Inc. under the name ISOPLUS Nutritional Supplement. This product has been widely accepted in the trade because of its ability to improve milk production by dairy cattle.

The calcium salts of the above-mentioned acids are free-flowing powders which may create dust problems in areas where the salts are produced and used. To avoid potential health hazards and to improve the handling properties of the salts, it became desirable to apply an anti-dusting agent to the salts and to convert the treated salts to pellets. After testing several materials, tallow was found to be the most effective dust suppressant. Tallow also provided the necessary binder and lubricant properties to permit the calcium salts powder to be formed into pellets to provide a product which could be conveniently and safely used, for example, by feed manufacturers or formulators. Tallow proved to be effective both as a dust suppressant and a pelletizing aid when used in a concentration in the range of about 8 to 12 weight percent based on the weight of the calcium salts.

Calcium salt-tallow powder has been found to cake into hard lumps after about two months storage, resulting in a product which is virtually worthless since it cannot be mixed with cattle feed. While the oxidative degradation of fats such as tallow are well known, the extent of the degradation in the presence of the calcium salts and the resulting lumping were most surprising. Attempts to replace tallow with other, more oxidatively-stable fats were not successful. While partially-hydrogenated soybean oil, fully-hydrogenated coconut oil and fully-hydrogenated tallow are effective dust suppressants and are measurably more stable when used in conjunction with the calcium salts, they decrease substantially the rate at which the resulting calcium salts compositions can be pelleted.

DESCRIPTION OF THE INVENTION

It is known to those skilled in the art that certain volatile fatty acids (e.g., isobutyric, valeric, isovaleric, 2-methylbutyric, or mixtures thereof) or their salts are useful in increasing milk production. See, for example, the aforementioned U.S. Pat. No. 4,376,790, the disclosure of which is incorporated herein by reference, and the references cited therein.

We have discovered that coconut oil or a mixture of coconut oil and tallow containing at least 60% coconut oil is a particularly useful additive for preparing animal feed supplements comprising the calcium salts of certain volatile fatty acids or mixtures thereof. We have found that these additives are effective both as a dust suppressant and as a pelleting aid for the calcium salts. Furthermore, these additives do not detrimentally affect the pelleting rate as compared to the calcium salts-tallow compositions and, most importantly, do not cause caking of powdered formulations.

According to the present invention, there is provided a nutritional supplement formulation in particulate form comprising a mixture of calcium salts of (1) isobutyric acid and (2) at least one acid selected from isovaleric, valeric, and 2-methylbutyric, and from about 5 to about 15% of an additive comprising from about 60 to 100% by weight coconut oil having an iodine value of greater than 5 and about 40-0% by weight tallow, the weight of said additive being based on the combined weight of the calcium salts and the additive.

Our invention thus pertains to novel animal feed supplement formulations in particulate form, e.g., powder form, comprising the calcium salts of certain volatile fatty acids and coconut oil or mixtures thereof with tallow.

The following mixtures of calcium salts are preferred. (I) Mixtures comprising the calcium salts of isobutyric, isovaleric, valeric, and 2-methylbutyric acids; of these mixtures, those comprised of about 8 to 84 weight percent calcium isobutyrate and about 92 to 16 weight percent of a mixture of calcium 2-methylbutyrate, calcium valerate and calcium isovalerate are preferred, wherein the total of the four salts is 100 weight percent. The most preferred of this composition of the calcium salts is about 14 to 66 weight percent calcium isobutyrate and about 86 to 34 weight percent of the mixed calcium salts of the C-5 acids with ranges of about 21 to 50 weight percent and about 79 to 50 weight percent respectively being most preferred. The amount of each C-5 acid salt, i.e., calcium salts of 2-methylbutyric, valeric and isovaleric acids, may be in the range of about 3 to 67 weight percent based on the total weight of the C-5 acid salts with a range of about 7 to 61 weight percent being preferred. (II) Mixtures comprising the calcium salts of isobutyric, 2-methylbutyric and isovaleric acids, wherein the isobutyric salts are present in amounts of about 35–45 weight percent, 2-methylbutyric salts are present in amounts of about 35–45 weight percent and the isovaleric salts are present in amounts of about 20–30 weight percent, wherein the total of the three salts is 100 weight percent. (III) Mixtures comprising the calcium salts of isobutyric and 2-methylbutyric acids, wherein the isobutyric salts are present in amounts of about 45–65 weight percent and the 2-methylbutyric salts are present in amounts of about 55–35 weight percent, wherein the total of these salts is 100 weight percent.

According to this invention, the mixtures of calcium salts of acids described above contain an additive of coconut oil, or a mixture of coconut oil with tallow. This additive may be present in the formulation in amounts of about 5–15% based on the combined weight of calcium salts and additive, with about 8–12% being preferred. Most preferably, the additive consists essentially of coconut oil, but mixtures of coconut oil containing up to about 40% by weight of additive of tallow are also useful.

The coconut oil useful in the present invention is preferably a commercially refined grade which has not been chemically modified, e.g., hydrogenated, to any significant extent. Such coconut oils have iodine values of greater than 5. Coconut oil is well-known in the art, and the properties are described in the art, for example, in Kirk-Othmer *Encyclopedia of Chemical Technology*, Second Edition, Volume 8, "Fats and Fatty Oils," pages 776 et seq. the components of coconut oil are listed, and the normal range of iodine value is about 7.5–10.5.

The coconut oil used in the present invention is preferably refined. The refining of such oil is a process known to those skilled in the art and is usually done to remove certain impurities such as free acids and gummy materials, and to improve color. Reference is again made to Kirk-Othmer *Encyclopedia of Chemical Technology*, Second Edition, Volume 8, pages 776 et seq.

The composition and properties of tallow which may be used in the present invention are also well-known to those skilled in the art. Reference is again made to the same section of *Encyclopedia of Chemical Technology*. The tallow may be hydrogenated, if desired, to improve stability.

In preparing the formulations according to the present invention, the coconut oil may be added to and mixed with the calcium salts by conventional mixing or blending procedures using conventional equipment at temperatures ranging from ambient to about 130° C. If the additives contain tallow, the coconut oil and tallow are preferably premixed.

The novel feed supplement formulation provided by this invention may contain, in addition to the calcium salts and additives described above, other materials such as minerals, unreacted calcium hydroxide and impurities contained in the lime used in preparing the calcium salts, water, extrusion and flow aids such as calcium stearate, flavors and fragrances such as passion fruit essence to mask the odor of the calcium salts and oxidation inhibitors and stabilizers such a tertiary butylanisole, tertiary butylhydroquinone, citric acid and the like.

The calcium salts can be prepared according to known saponification procedures to obtain the salts substantially free of the water of reaction.

The novel formulations and the preparation thereof are further illustrated by the following examples, which are submitted for a better understanding of this invention.

EXAMPLE 1

To a 2-liter resin kettle equipped with an agitator, addition funnel, Dean-Stark trap and an inlet for a nitrogen blanket are charged 74.1 g. lime assaying 95.4% available calcium hydroxide. The lime is heated to and held at 130° C. under a slow stream of nitrogen, and a mixture containing 31.5% isobutyric acid and 68.5% mixed C-5 acid (approximately 36% 2-methylbutyric, 33% valeric and 31% isovaleric), 195 g total, is added dropwise over two hours. The dry, powdery product is stirred for 10 additional minutes and then cooled. The product weighs 221.5 g (8.9 g acids are lost overhead) and assays 98.59% mixed calcium salts. The impurities include 0.51% unreacted calcium hydroxide and 0.35% water.

EXAMPLE 2

The product obtained in Example 1 is heated to 100° C. in the above-described apparatus, and a mixture of 21.6 g of refined coconut oil (76° F.), 0.2 g calcium stearate, 0.24 g passion fruit essence and 0.022 g of an inhibitor composition (20% tertiary butylhydroquinone, 10% citric acid and 70% propylene glycol) is added dropwise with stirring over a period of approximately five minutes. The mixture is stirred an additional 30 minutes at 100° C. and then cooled to give a free flowing powder.

EXAMPLE 3

A composition identical to that prepared in Example 2 except for the omission of the calcium stearate is prepared using substantially the same procedure as described in Example 2.

Using the oils or fats set forth in the following examples, additional compositions are prepared using substantially the same procedure and the same amounts of oil, passion fruit essence and inhibitor composition but omitting the calcium stearate.

EXAMPLE 4

The oil used is a blend of 70 parts by weight of refined coconut oil and 30 parts by weight of blended tallow.

EXAMPLE 5

The oil used is a blend of 70% by weight of refined coconut oil and 30% by weight of a tallow supplied by Iowa Beef Packing (IBP).

EXAMPLE 6

The oil used is a blend of 70% by weight of refined coconut oil and 30% by weight partially hydrogenated tallow.

EXAMPLE 7

The oil used is refined coconut oil containing 1% by weight Syloid, a fused silicon dioxide supplied by W. R. Grace.

EXAMPLE 8

The oil used is refined coconut oil containing 10% by weight of Myverol 1800 monoglyceride, a glycerol monostearate supplied by Eastman Chemical Products, Inc.

EXAMPLE 9

To a 2-liter resin kettle equipped with an agitator, addition funnel, Dean-Stark trap and an inlet for a nitrogen blanket is charged 74.1 g lime assaying 95.4% available calcium hydroxide. The lime is heated to and held at 130° C. under a slow stream of nitrogen, and a mixture containing 55% isobutyric acid and 45% 2-methylbutyric acid, 188 g total, is added dropwise over two hours. The dry, powdery product is stirred for 10 additional minutes and then cooled. The product weighs 213.5 g (8.5 g acids are lost overhead) and assays 98.59% mixed calcium salts. The impurities include 0.51% unreacted calcium hydroxide and 0.35% water. This product, when mixed with 10 weight % (1) coconut oil as described herein, or (2) 70 weight % coconut oil and 30 weight % tallow, both as described herein, is found to be easily pelletizable, resistant to dusting and resistant to caking.

EXAMPLE 10

To a 2-liter resin kettle equipped with an agitator, addition funnel, Dean-Stark trap and an inlet for a nitrogen blanket is charged 74.1 g lime assaying 95.4% available calcium hydroxide. The lime is heated to and held at 130° C. under a slow stream of nitrogen, and a mixture containing 41% isobutyric acid and 59% mixed C-5 acid (approximately 56% 2-methylbutyric, 44% isovaleric), 191 g total, is added dropwise over two hours. The dry, powdery product is stirred for 10 additional minutes and then cooled. The product weighs 216 g (8.9 g acids are lost overhead) and assays 98.59% mixed calcium salts. The impurities include 0.51% unreacted calcium hydroxide and 0.35% water. This product, when mixed with 10 weight % (1) coconut oil as described herein, or (2) 70 weight % coconut oil and 30 weight % tallow, both as described herein, is found to be easily pelletizable, resistant to dusting and resistant to caking.

COMPARATIVE EXAMPLE 1

The oil used is blended tallow.

COMPARATIVE EXAMPLE 2

The oil used is hydrogenated coconut oil (M.P.=110° F.).

COMPARATIVE EXAMPLE 3

The oil used is partially hydrogenated soybean oil (Soya 6694).

COMPARATIVE EXAMPLE 4

The oil used is partially-hydrogenated tallow.

COMPARATIVE EXAMPLE 5

The oil used is a blend of 50 parts by weight partially hydrogenated tallow and 50 parts by weight refined tallow.

COMPARATIVE EXAMPLE 6

The oil used is tallow supplied by Iowa Beef Packers.

COMPARATIVE EXAMPLE 7

The oil used is blended tallow containing 1% by weight Syloid.

COMPARATIVE EXAMPLE 8

The oil used is a refined tallow.

The oils used in the examples above were stated by their suppliers to have the following physical properties.

| Oil | Iodine Value | Titer °C. | Wiley Melting Point, °C. |
| --- | --- | --- | --- |
| Refined coconut oil (76° F.) | 6 | — | 24 |
| Blended tallow | 50–55 | 42 | — |
| Hydrogenated coconut oil (110° F.) | 1.3 | — | 43 |
| Partially hydrogenated soybean oil | 64 | — | 45.2 |
| Partially hydrogenated tallow | 45–50 | 42.5–44 | 46.8 |
| IBP Tallow | 52 | 42 | — |
| Refined Tallow | 50–55 | 42 | — |

Titer is the temperature at which the fatty acids of a fat which has been liberated from the fat by hydrolysis solidify. Wiley Melting Point is determined in accordance with AOCS Method Cc 2-38.

To evaluate the stability, and the propensity of the compositions to cake or "set-up" upon storage, those compositions of the examples which contain different oils are submitted to an accelerated aging test by placing each composition in a bag constructed of 2.0-mm thick polyethylene film, tying the bag shut and placing the bag in a forced-air oven in which the temperature is maintained at 60° C. Samples are oxidative degradation and cake strength for each composition are determined.

The oxidation degradation is determined by stirring the sample (10 g) with methylene chloride (100 ml) at reflux for 30 minutes. The slurry is filtered, and the volatile components of the filtrate are removed on a rotary evaporator (60° C., 1 Torr). The residue is analyzed spectroscopically for calcium by atomic absorption, for loss in unsaturation by nuclear magnetic resonance (internal standard method) and for calcium carboxylate by infrared at 1555 cm$^{-1}$.

The amount of extractable calcium ([Ca], ppm) for sample of each composition submitted to extraction and analysis after various periods of accelerated aging is set forth in Table I. The extractable calcium is given as days of accelerated aging/ppm [Ca]. For example, 1/10 means after 1 day, 10 ppm (parts per million) calcium has been extracted. The compositions are identified by reference to the example (E) or comparative example (CE) describing their preparation.

TABLE I

| Composition | Extractable Calcium (Days/ppm [Ca] Extracted) | | | |
| --- | --- | --- | --- | --- |
| E-3 | 1/0 | 7/1500 | 14/2000 | 38/700 |
| E-4 | 1/70 | 6/3000 | 14/4800 | 38/6000 |
| E-5 | 1/1300 | 6/320 | 14/6000 | 38/3800 |
| E-6 | 1/220 | 6/470 | 14/4000 | |
| CE-1 | 1/1400 | 6/34,000 | 11/40,000 | 38/45,000 |
| CE-4 | 1/260 | 6/1050 | 14/32,000 | |
| CE-6 | 1/1050 | 6/7000 | 14/32,000 | |
| CE-8 | 1/1364 | 6/26,000 | 12/2900 | |

The extractable calcium values determined for the composition of Comparative Example 1 correlates very closely with the same values for commercial quantities of the same composition which have been stored for two to six months. By analogy to mechanisms proposed for the auto-oxidation of drying oils in paints, the methylene chloride-extractable calcium apparently results from the formation of carboxyl groups on the fatty acid moieties of the oils which, in turn, are formed as a result of peroxide formation adjacent to the points of unsaturation. Excess calcium hydroxide present in the calcium salts then reacts with the carboxyl groups.

The specific cake strength (SCS) is determined for the compositions evaluated for oxidative stability. A powdered sample (20 g) of the composition submitted to the accelerated aging test described above is mixed with water (1 g) using a mortar and pestle and the mixture is transferred to a glass jar which is sealed and placed in an oven maintained at a temperature of 60° C. for 17 hours. After cooling, the contents of the jar are ground up, and 5 g portions of the sample are placed in three 12 cc compactor cells having a 1-inch diameter. A mass of 600 g is placed over each of the cells which are then heated at 40° C. for two hours. After cooling to ambient temperature the SPS for each of the five g compressed samples is determined by raising the compressed samples against a Schaevitz Force Transducer. The force (as an average for the three caked samples) in g required to break the caked samples is set forth in Table II. As in the case of the data reported in Table I, the SCS values are given as days of accelerated aging-/force, (g), and the compositions are identified by reference to the examples (E) or comparative examples (CE) describing their preparation. The maximum force measurable by this device is 11,000 g. The designation "1/3000," for example, indicates after 1 day a force of 3000 g is required to break the sample.

TABLE II

| Composition | Specific Cake Strength (g) | | | |
|---|---|---|---|---|
| E-3 | 1/3000 | 7/5308 | 14/1726 | 38/1075 |
| E-4 | 1/3000 | 6/1190 | 14/1080 | 38/952 |
| E-5 | | 6/5323 | 14/3437 | 38/2489 |
| E-6 | | 6/4970 | 14/1642 | |
| CE-1 | 1/3509 | 6/1100 | 11/11000 | 38/11000 |
| CE-4 | | 6/4970 | 14/10336 | |
| CE-6 | | 6/5261 | 14/10814 | |
| CE-8 | | | 12/11000 | |

The iodine values specified herein are measured in accordance with AOCS Official Method Cd 1-25 (rev. April 1956), Official and Tentative Methods of the American Oil chemists Society, 2nd ed., additions and revisions 1947 through 1963, inclusive.

Where the designation "C-5" acids is used herein, it is intended to mean acids having 5 carbon atoms such as valeric, isovaleric and 2-methylbutyric.

Unless otherwise specified, all parts, percentages, ratios, etc., are by weight.

The invention has been described in detail with particular reference to preferred embodiments thereof, but it will be understood that variations and modifications will be effected within the spirit and scope of the invention.

We claim:

1. An animal nutritional supplement formulation in particulate form consisting essentially of
   (a) a mixture of calcium salts of (1) isobutyric acid and (2) at least one acid selected from isovaleric, valeric, and 2-methylbutyric, and
   (b) from 5 to 15% of an additive comprising from 60 to 100% by weight coconut oil having an iodine value of greater than 5 and 40-0% by weight tallow, the weight of said additive being based on the combined weight of calcium salts and additive; wherein said formulation is easily pelletizable and is resistant to dusting and caking.

2. An animal nutritional supplement formulation in particulate form consisting essentially of
   (a) a mixture of calcium salts of (1) isobutyric acid and (2) at least one acid selected from isovaleric, valeric, and 2-methylbutyric, and
   (b) from 5 to 15% of an additive comprising from 70 to 100% by weight coconut oil having an iodine value of greater than 5 and 30-0% by weight tallow, the weight of said additive being based on the combined weight of calcium salts and additive; wherein said formulation is easily pelletizable and is resistant of dusting and caking.

3. A formulation according to claim 2 wherein said mixture consists essentially of calcium salts of isobutyric, isovaleric, valeric and 2-methylbutyric acids.

4. A formulation according to claim 2 wherein said mixture consists essentially of calcium salts of isobutyric, 2-methylbutyric and isovaleric acids.

5. A formulation according to claim 2 wherein said mixture consists essentially of calcium salts of isobutyric and 2-methylbutyric acids.

6. A formulation according to claim 2 wherein said additive consists essentially of 90-100% by weight of said coconut oil and 10-0% by weight tallow.

7. A formulation according to claim 2 wherein said additive consists essentially of said coconut oil.

8. An animal nutritional supplement formulation according to claim 2 which is in pellet form.

9. An animal feed composition consisting essentially of the nutritional supplement formulation according to claim 2.

10. An animal nutritional supplement formulation consisting essentially of a mixture of calcium salts of isobutyric, isovaleric, valeric and 2-methylbutyric acids and an additive consisting essentially of coconut oil having an iodine value of greater than 5; wherein said formulation is easily pelletizable and is resistant to dusting and caking.

11. An animal nutritional supplement formulation consisting essentially of a mixture of calcium salts of isobutyric and 2-methylbutyric acids and an additive consisting essentially of coconut oil having an iodine value of greater than 5; wherein said formulation is easily pelletizable and is resistant to dusting and caking.

12. An animal nutritional supplement formulation consisting essentially of a mixture of calcium salts of isobutyric, isovaleric, and 2-methylbutyric acids and an additive consisting essentially of coconut oil having an iodine value of greater than 5; wherein said formulation is easily pelletizable and is resistant to dusting and caking.

* * * * *